United States Patent
Oroskar et al.

(10) Patent No.: US 10,172,029 B1
(45) Date of Patent: Jan. 1, 2019

(54) CONTROLLING TTI BUNDLING BASED ON WHETHER DEVICE PROVIDES WIRELESS RELAY BACKHAUL CONNECTIVITY

(71) Applicant: Sprint Spectrum L.P., Overland Park, KS (US)

(72) Inventors: Siddharth S. Oroskar, Overland Park, KS (US); Jasinder P. Singh, Olathe, KS (US); Rajil Malhotra, Olathe, KS (US); Nitesh Manchanda, Overland Park, KS (US)

(73) Assignee: Sprint Spectrum L.P., Overland Park, KS (US)

(*) Notice: Subject to any disclaimer, the term of this patent is extended or adjusted under 35 U.S.C. 154(b) by 139 days.

(21) Appl. No.: 15/005,313

(22) Filed: Jan. 25, 2016

(51) Int. Cl.
| | |
|---|---|
| *H04W 4/00* | (2018.01) |
| *H04W 28/02* | (2009.01) |
| *H04W 72/04* | (2009.01) |
| *H04W 24/02* | (2009.01) |
| *H04M 7/00* | (2006.01) |
| *H04W 88/08* | (2009.01) |
| *H04W 88/04* | (2009.01) |

(52) U.S. Cl.
CPC ....... *H04W 28/0231* (2013.01); *H04M 7/006* (2013.01); *H04W 24/02* (2013.01); *H04W 72/0446* (2013.01); *H04W 88/04* (2013.01); *H04W 88/08* (2013.01)

(58) Field of Classification Search
CPC ............. H04W 28/0231; H04W 24/02; H04W 72/0446; H04M 7/006
USPC ........................................................ 370/330
See application file for complete search history.

(56) References Cited

U.S. PATENT DOCUMENTS

| | | | | |
|---|---|---|---|---|
| 9,699,721 | B2* | 7/2017 | Yang | H04W 48/20 |
| 2007/0242647 | A1* | 10/2007 | Bennett | H04W 88/04 |
| | | | | 370/338 |
| 2010/0329188 | A1* | 12/2010 | Jen | H04B 7/2606 |
| | | | | 370/328 |
| 2012/0207040 | A1* | 8/2012 | Comsa | H04W 72/1215 |
| | | | | 370/252 |
| 2012/0269113 | A1* | 10/2012 | Park | H04B 7/2656 |
| | | | | 370/315 |
| 2013/0190000 | A1 | 7/2013 | Boudreau et al. | |
| 2017/0099118 | A1* | 4/2017 | Negaluguli | H04L 1/0026 |
| 2017/0099658 | A1* | 4/2017 | Shattil | H04W 72/048 |

* cited by examiner

*Primary Examiner* — Sai Ming Chan (57) ABSTRACT

A method and system for a base station to manage air interface communications with a wireless client device (WCD) served by the base station, taking into account whether the WCD is a relay-WCD that provides wireless backhaul connectivity for a relay base station. The base station will determine whether the served WCD is a relay-WCD, and based on a determination that the served WCD is a relay-WCD, the base station will responsively invoke a process to help expedite air interface communications with the served WCD, in an effort to reduce the total delay resulting from the wireless relay arrangement. In particular, based on the served WCD being a relay-WCD, and perhaps based on the relay-WCD facilitating a threshold extent of delay-sensitive communication, the base station will invoke transmission time interval (TTI) bundling, to help expedite the air interface communications between the base station and the relay-WCD.

27 Claims, 4 Drawing Sheets

CONTROLLING TTI BUNDLING BASED ON WHETHER DEVICE PROVIDES WIRELESS RELAY BACKHAUL CONNECTIVITY

BACKGROUND

Unless otherwise indicated herein, the description provided in this section is not itself prior art to the claims and is not admitted to be prior art by inclusion in this section.

A typical wireless network includes a number of base stations each radiating to provide coverage in which to serve wireless client devices (WCDs) such as cell phones, tablet computers, tracking devices, embedded wireless modules, and other wirelessly equipped devices, whether or not user operated. In turn, each base station may be coupled with a switch or gateway that provides connectivity with one or more transport networks, such as the public switched telephone network (PSTN) and/or the Internet for instance. With this arrangement, a WCD within coverage of the network may engage in air interface communication with a base station and may thereby communicate via the base station with various remote network entities or with other WCDs served by the base station.

Further, such a network may operate in accordance with a particular radio access protocol, examples of which include, without limitation, Orthogonal Frequency Division Multiple Access (OFDMA (e.g., Long Term Evolution (LTE) and Wireless Interoperability for Microwave Access (WiMAX)), Code Division Multiple Access (CDMA) (e.g., 1×RTT and 1×EV-DO), Global System for Mobile Communications (GSM), IEEE 802.11 (WIFI), BLUETOOTH, and others. Each protocol may define its own procedures for registration of WCDs, initiation of communications, handover between base station coverage areas, and other functions.

Each base station may provide wireless service to WCDs on one or more carrier frequencies (carriers), each of which could be frequency division duplex (FDD), defining separate frequency channels for downlink and uplink communication, or time division duplex (TDD), defining a frequency channel multiplexed over time between downlink and uplink use. Each carrier or its respective channels could be within a defined frequency band and could be of a particular frequency bandwidth, such as 5 MHz, 10 MHz, or 20 MHz for instance, defining a certain extent of air interface resources. A given base station could be arranged to serve a WCD on a single such carrier at a time or, with carrier aggregation service or the like, on multiple such carriers at a time.

Further, each base station in such a network may be communicatively linked with a signaling controller that carries out various network control functions, such as managing setup of bearer connections between the base station and one or more transport networks, tracking were WCDs are located in the network, paging WCDs, and the like. In addition, neighboring base stations may be communicatively linked with each other, to facilitate handover and other inter-base station signaling.

By way of example, in an LTE network, each base station (LTE evolved Node-B (eNodeB)) has a communication interface with a signaling controller known as a mobility management entity (MME), the base station and MME each also have a respective communication interface with a gateway system that provides connectivity with a packet-switched transport network, and the base station has a communication interface with each of its neighboring base stations. Typically, the nodes of such an LTE network would sit on a wireless service provider's core packet-switched network (e.g., a network compliant with the industry standard system architecture evolution (SAE) for the LTE protocol), and so the base station and each other network entity (e.g., MME, gateway, and neighboring base station) may each have an assigned Internet Protocol (IP) address on that network, and the interfaces between these entities may be defined as logical connections (e.g., established virtual tunnels) through that network.

In example operation, when a WCD enters into coverage of an LTE base station on a particular carrier, the WCD signals to the base station to initiate an attach process and to establish a radio-link-layer connection with the base station. In this process, the base station signals to the MME, the MME authenticates the WCD, the MME and base station obtain and store a context/profile record for the WCD, and the gateway system assigns an IP address to the WCD for use by the WCD to communicate on the packet-switched transport network. Further, at this point or later, the MME may engage in signaling with the base station and the gateway system to establish for the WCD one or more bearers for carrying packet data between the WCD and the transport network.

Once a WCD is so attached with a base station, the base station then serves the WCD on one or more carriers, managing downlink communication of packet data to the WCD and uplink communication of packet data from the WCD. For example, as the gateway system receives packet data destined to the WCD, the gateway system may forward the packet data to the base station, and the base station may schedule and provide transmission of that data to the WCD on the WCD's serving carrier(s). Likewise, as the WCD has packet data to transmit on the transport network, the WCD may transmit a scheduling request to the base station, the base station may schedule transmission of that data from the WCD on the WCD's serving carrier(s), the WCD may accordingly transmit the data to the base station, and the base station may then forward the data to the gateway system for output on the transport network.

Optimally, a wireless service provider will strategically implement base stations throughout a market area so that served WCDs can move between the base station coverage areas without loss of coverage. Each base station may include an antenna structure and associated equipment, and the wireless service provider may connect the base station by a landline cable (e.g., a T1 line) with the service provider's network infrastructure to enable the base station to communicate with a signaling controller (e.g., MME), gateway system, other base stations, and the like.

In practice, however, it may be impractical for a wireless service provider to run landline connections to base stations in certain locations. For instance, where a service provider seeks to provide many small coverage areas blanketing a market area or to fill in coverage holes between coverage of other base stations, the service provider may implement many small-cell base stations throughout the market area, but it may be inefficient or undesirable to run landline cables to every one of those small-cell base stations.

To connect a base station with the network infrastructure in such a situation, the wireless service provider may implement a wireless backhaul connection between the base station and another base station of the service provider's network. In this situation, the base station at issue operates as a relay base station, and the other base station operates as a donor base station. In practice, the relay base station includes or is coupled (e.g., via a local area network or other connection) with a WCD, referred to as a relay-WCD, and the donor base station then serves the relay-WCD in much the same way that the donor base station serves other WCDs. Further, the relay base station itself serves WCDs, in much the same way that any base station would.

With this arrangement, when the relay-WCD attaches with the donor base station, the relay-WCD may acquire connectivity and an IP address as discussed above for instance. But based on a profile record for the relay-WCD, the network (e.g., a signaling controller) may recognize that the relay-WCD is a relay-WCD (rather than a normal end-user WCD) and may therefore set up a bearer connection for that relay-WCD with a special core network gateway system (e.g., "SAE GW") that provides for internal core network connectivity and assigns the relay-WCD with an IP address for use to communicate within the core network. Once the relay-WCD receives that core network IP address assignment, the relay-WCD may then convey that IP address to the relay base station for use by the relay base station as the relay base station's IP address on the core network. The relay base station may then operate as a full-fledged base station of the network, having IP-based interfaces with other core network entities (e.g., a signaling controller, a gateway system, and other base stations), albeit with those interfaces passing via the wireless backhaul connection provided by the relay-WCD, and via the core network gateway system.

Once the relay base station is thus in operation, the relay base station may then serve WCDs in the same way as a standard base station serves WCDs. Thus, when a WCD enters into coverage of the relay base station, the WCD may signal to the relay base station to initiate an attach process, the WCD may acquire an IP address, and an MME may engage in signaling to establish one or more bearers between the WCD and a gateway system. Each of these bearers, though, like the relay base station's signaling communication, would pass via the relay's wireless backhaul connection.

OVERVIEW

Normally, when a base station having an IP address on the core network communicates with other entities on the core network, such as with a signaling controller, a gateway system, and other base stations, the communication will be relatively quick. Unfortunately, however, if the base station is a relay base station that has a wireless backhaul connection with the core network, communications between the relay base station and other entities on the core network may experience delay.

One source of this delay may be the process of scheduling and engaging in communication over the wireless backhaul connection between the donor base station and the relay-WCD. On the downlink, for instance, as the donor base station receives data for transmission to the relay-WCD and ultimately to the relay base station, the donor base station may buffer the data until the donor base station schedules and transmits the data to the relay-WCD. And on the uplink, as the relay-WCD receives data from the relay base station for transmission to the donor base station, the relay-WCD may buffer the data, transmit a scheduling-request to the donor base station, receive a scheduling directive from the donor base station, wait until the scheduled time, and then transmit the data to the donor base station.

Further, another source of this delay may be the routing of such communications through a special core network gateway system as noted above. In particular, when a communication is to be sent between the relay base station and another core network entity, such as a signaling controller, a gateway system, or another base station, those communications may be routed through a special core network gateway system. For example, when a packet data arrives on the transport network and is destined for a WCD served by the relay base station, that data may be routed to the core network gateway system that assigned the relay base station's IP address, and from there the data may pass to the donor base station, to the relay-WCD, and to the relay base station. Likewise, when a signaling controller or other base station has data to send to the relay base station, that data may pass to the core network gateway system before then passing from there to the donor base station, the relay-WCD, and the relay base station. Similarly, uplink communications may also flow through the core network gateway system on their way from the relay base station to their destination.

Due to these or other factors, the wireless relay arrangement could add on the order of 10 to 20 milliseconds of delay to communications between a relay base station and other core network entities. While such delay may not be problematic for some types of communication, the delay could be especially problematic for communications that are delay sensitive, such as voice and other real-time media communications, and for control signaling traffic such as handover signaling and bearer setup signaling. Consequently, an improvement is desired.

Disclosed herein is a method and system for a base station to manage air interface communications with a WCD served by the base station, taking into account whether the WCD is a relay-WCD that provides wireless backhaul connectivity for a relay base station. The base station will determine whether the served WCD is a relay-WCD, and based on a determination that the served WCD is a relay-WCD, the base station will responsively invoke a process to help expedite air interface communications with the served WCD, in an effort to reduce the total delay resulting from the wireless relay arrangement. In particular, based on the served WCD being a relay-WCD (and perhaps based on one or more additional factors), the base station will invoke transmission time interval (TTI) bundling, to help expedite the air interface communications between the base station and the relay-WCD.

TTI bundling can help to expedite air interface communications between a base station and a served WCD by helping to reduce delay that might otherwise result from re-transmission requests and re-transmissions due to failed transmission attempts.

Normally, when a base station schedules transmission of packet data over the air to or from a served WCD, if the receiving end (the WCD or base station) does not successfully receive the transmitted packet data, the receiving end will then ask the transmitting end (the base station or WCD) to re-transmit. After some defined delay period such as four milliseconds for instance, the transmitting end will then responsively re-transmit to the receiving end. And this request/re-transmission process may repeat some defined number of times until the receiving end determines that it has successfully received the data. (Each re-transmission in this process could be of the same data or could be just a portion of the same data together with some error-correction coding, and the receiving end could maintain a copy of any portion of the transmission it receives in instance transmission attempt, so as to try to uncover the intended data transmission based on a combination of the multiple transmission attempts.)

TTI bundling helps to expedite transmission by having the transmitting end automatically engage in multiple repeat transmission attempts to the receiving end without waiting for a re-transmission request and associated delay period after each attempt. For instance, the transmitting end could engage in the scheduled transmission and could automatically provide a re-transmission every millisecond thereafter for the next three milliseconds or another designated number of times defining a "bundling" factor. In practice, the base station could invoke use of TTI bundling for a served WCD by scheduling the TTI bundling when the base station schedules communication to or from the WCD.

By invoking TTI bundling in response to, or based at least in part on, the served WCD being a relay-WCD that provides wireless backhaul connectivity, the serving base station can help to expedite air interface transmission between the relay-WCD and the serving base station, and thus to reduce or minimize the overall delay of communications to or from a relay base station.

Accordingly, in one respect, disclosed is a method of managing air interface communication between a base station and a WCD served by the base station. In accordance with the method, the base station determines that the WCD is a relay-WCD (as compared with an end-user WCD for instance), and, based on determining that the WCD is a relay-WCD, the base station invokes TTI bundling of air interface communication between the base station and the WCD. In practice, the base station could invoke such TTI bundling for uplink communication from the WCD to the base station and/or for downlink communication from the base station to the WCD.

In another respect, disclosed is a base station, including a transmitter for transmitting downlink air interface communications in a plurality of downlink channels, a receiver for receiving uplink air interface communications in a plurality of uplink channels, and a controller for controlling aspects of air interface communication. In accordance with the disclosure, the controller is configured to (i) determine whether a wireless client device (WCD) served by the base station is a relay-WCD or rather an end-user WCD and, (ii) based on the determination being that the WCD is a relay-WCD, invoke TTI bundling of air interface communication between the base station and the WCD.

And in still another respect, disclosed is a wireless communication system comprising a first base station configured to serve WCDs over a first air interface, and a relay including a relay-WCD and a second base station. The first base station is configured to serve the relay-WCD over the first air interface, and the second base station is configured to serve WCDs over a second air interface. Further, the first base station is configured to carry out operations such as those noted above and thus to (i) determine that the relay-WCD is a relay-WCD rather than an end-user WCD and (ii) based on the determining, invoke TTI bundling of communications between the first base station and the relay-WCD over the first air interface.

In addition, considering that the delay added by the wireless relay arrangement may be particularly problematic for delay-sensitive communications such as voice or other real-time media communications, the decision to invoke TTI bundling could additionally be based on a determination that the relay is serving a threshold great extent such delay-sensitive communication traffic. For instance, if the relay is (e.g., has been) serving many WCDs with voice over IP (VoIP) calls or the like, it may be most worthwhile to invoke TTI bundling for the air interface communication between the relay and a donor base station, to help reduce the overall delay in carrying the VoIP call traffic end-to-end between the relay-served WCDs and remote call parties.

To facilitate this added feature, the relay could monitor the extent of delay-sensitive traffic that it is serving, and, in response to determining that the relay is serving at least a threshold great extent of such delay-sensitive traffic, the relay could signal (or trigger signaling) to the donor base station to cause the donor base station to begin applying TTI bundling to air interface communications between the donor base station and the relay. Alternatively, as the relay's served bearer traffic would flow through the SAE GW or other such core network entity, the SAE GW or other such core network entity could monitor the extent to which such bearer traffic is delay-sensitive traffic, and, in response to thereby determining that the relay is serving at least a threshold great extent of such delay-sensitive traffic, that core network entity could then signal (or trigger signaling) to the donor base station to cause the donor base station to begin applying TTI bundling to air interface communications between the donor base station and the relay.

In this way, the fact that the relay is serving a threshold extent of delay-sensitive traffic such as VoIP traffic or the like can serve as a further basis (in addition to the fact that a wireless relay arrangement is involved as a basic matter) for the invocation of TTI bundling. For instance, TTI bundling could be invoked in response to determining that (i) the WCD at issue is a relay-WCD and (ii) the relay base station is serving a threshold extent of delay-sensitive traffic. Likewise, application of TTI bundling as described above could be conditioned on the relay serving a threshold extent of such delay-sensitive traffic.

Accordingly, in yet another respect, disclosed is a method of managing air interface communication between a first base station and a WCD served by the first base station. In accordance with the method, a determination is made that the WCD is a relay-WCD (as compared with an end-user WCD for instance) and that a second base station for which the relay-WCD provides wireless backhaul connectivity is serving a threshold great extent of delay-sensitive traffic, and, as a result of the determination, the first base station invokes TTI bundling of air interface communication between the first base station and the WCD, for uplink and/or downlink communication.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and apparatus will be described herein in the context of LTE as an example radio access protocol and associated network arrangement. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processing unit executing software instructions for instance.

Figure 1:
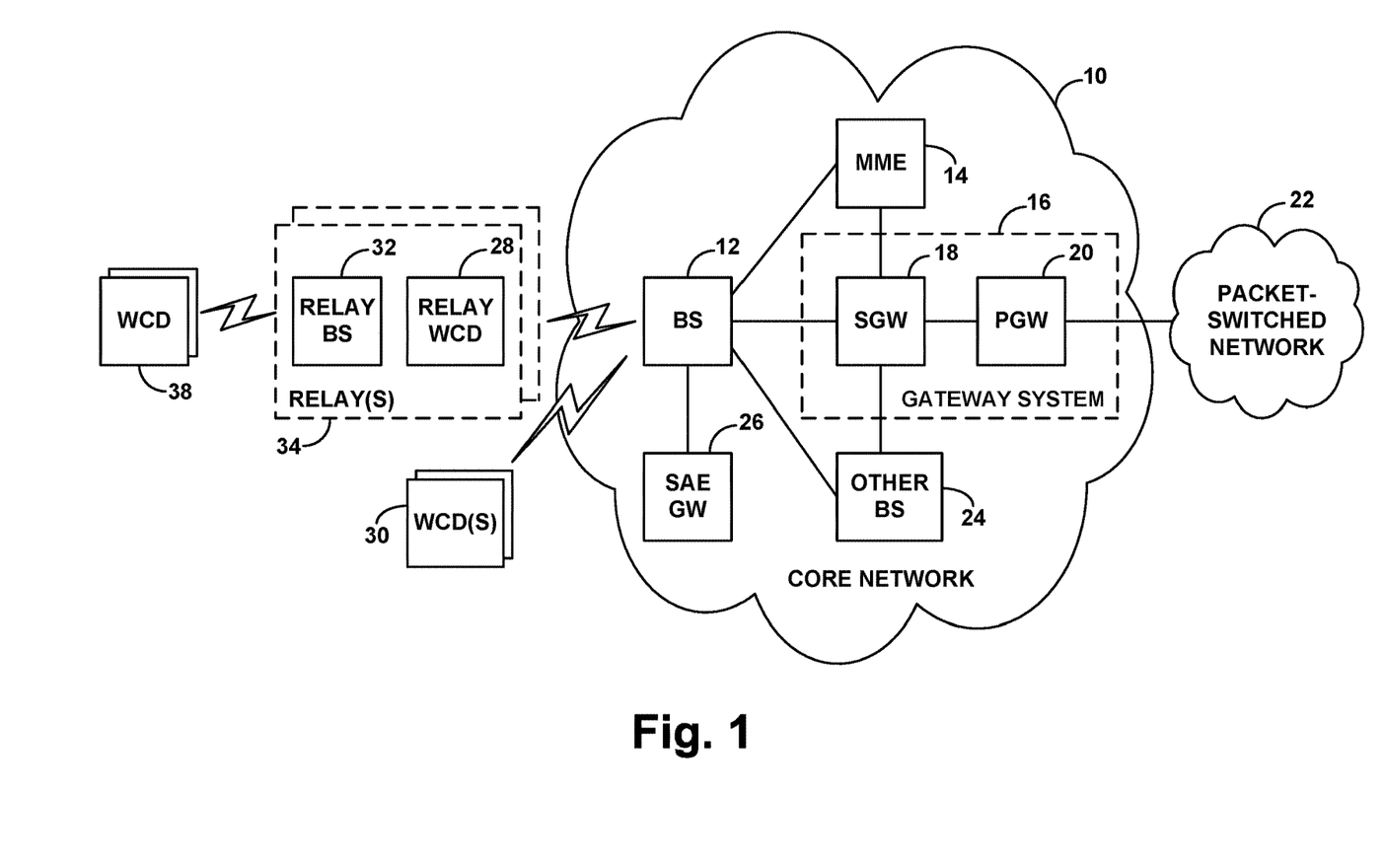
FIG. 1 is a simplified block diagram of a wireless communication system in which the present method and system can be implemented.

Referring to the drawings, as noted above, FIG. 1 is a simplified block diagram of a wireless communication system in which the present method and system can be implemented. In particular, FIG. 1 depicts a representative LTE core network 10, which functions primarily to serve WCDs with wireless packet data communication service, including possibly voice-over-packet service, but may also provide other functions. The core network 10 may be a packet-switched network, compliant with the industry standard system architecture evolution (SAE) for the LTE protocol.

As shown, network 10 includes an example base station (BS) 12, which has an antenna structure and associated equipment (not shown) for providing LTE coverage in which to serve the WCDs. The base station 12 then has communication interfaces with an example MME 14, functioning as a signaling controller for the network 10. Further, the base station 12 has a communication interface with a gateway system 16, which includes a serving gateway (SGW) 18 and a packet-data-network gateway (PGW) 20, the PGW provides connectivity with a packet-switched transport network 22 such as the Internet, and the MME 14 has a respective communication interface with the SGW 18 as well. In addition, the base station 12 has a communication interface, such as an industry standard X2 interface, with another base station 24.

As further shown, network 10 then also includes, and base station 12 has an interface with, a special core network gateway depicted as an "SAE GW" 26, which serves to provide connectivity within the network 10, for a relay-WCD and relay base station as noted above for instance.

Additionally shown in FIG. 1, within coverage of base station 12, are then a plurality of WCDs, including at least one relay-WCD 28 and at least one non-relay WCD 30. Each non-relay WCD 30 may be an end-user WCD such as one of the types of WCDs noted above (e.g., cell phone, tablet computer, tracking device, etc.) that is not set to provide wireless backhaul connectivity for a relay base station. Whereas, each relay-WCD 28 may be a WCD that is set to provide wireless backhaul connectivity for a relay base station 32. As such, a relay-WCD could be a conventional WCD (e.g., cell phone or the like) that is locally coupled with a relay base station (e.g., via a local area network or direct cable or wireless connection) and that is configured to operate as a relay-WCD for the relay base station, or the relay-WCD could be a WCD module that is incorporated within a base station, thereby allowing the base station to obtain wireless backhaul connectivity and thus function as a relay base station. FIG. 1 thus further depicts relay WCD 28 and relay base station 32 cooperatively defining a relay 34. As such, base station 12 serves as a donor base station for relay 34 and as a conventional base station for each non-relay WCD 30, relay 34 has a wireless backhaul connection 36 with the donor base station 12, and relay 34 then provides its own wireless coverage for serving one or more other WCDs 38.

In practice, each of these WCDs may be configured within the network 10 as a device to be served by the network (such as an authorized subscriber device), and a mechanism may be provided to distinguish relay-WCDs from conventional WCDs, so as to facilitate treating relay-WCDs differently than conventional WCDs. By way of example, a relay-WCD may have a special identifier or operate and be served by the network under a special network identifier (e.g., a special public land mobile network (PLMN) identifier, or special packet data network (PDN) connection identifier), indicating that the relay-WCD will be operating as a relay-WCD. Whereas a conventional WCD may have an identifier or be served by the network under an identifier that does not indicate the WCD will be operating as a relay-WCD and thus that may establish the WCD is not a relay-WCD. Accordingly, when a WCD attaches with the network, such as with base station 12, the network (e.g., the base station, MME, and/or other network entity) may determine whether the WCD is a relay-WCD (i.e., whether the WCD provides wireless backhaul connectivity for a relay base station) or not, based on such identification or other information provided by the WCD during attachment or noted in a network profile record for the WCD.

In an LTE network such as this, when base station 12 is put in service, the base station 12 may acquire an IP address for use within the network 10. Further, the base station 12 may then engage in signaling ((stream control transmission protocol (SCTP) signaling) with MME 14 to establish an S1-AP connection (S1-AP interface) with the MME. To facilitate this, the base station 12 may be pre-provisioned with data specifying the IP address of the MME so that the base station 12 can engage in signaling with the MME to set up such a connection. This S1-AP connection with the MME then serves as a signaling channel between the base station 12 and the MME.

When a WCD (such as WCD 28 or WCD 30) initiates attachment with base station 12, base station 12 may then signal to the MME to trigger establishment for the WCD of an S1-MME connection (S1-MME interface) between the base station 12 and the MME. Further, this signaling also causes the MME to engage in signaling to establish some other connections for the WCD, which may vary based on whether the WCD is a conventional WCD or rather a relay WCD (e.g., as indicated by the WCD's PLMN identifier or other data). If the WCD is a conventional WCD, then the MME may engage in signaling with the base station 12 and SGW 18 to establish for the WCD an S1-U connection (S1-U interface) between the base station 12 and the SGW 18 and an S5 connection (S5 interface) between the SGW 18 and the PGW 20, and PGW 20 may assign to the WCD an IP address for use on external packet-switched network 22. Whereas, if the WCD is a relay-WCD, then the MME may engage in signaling with the base station 12 and SAE GW 26 to establish for the WCD an S1-U connection between the base station 12 and the SAE GW 26 and, internally within the SAE GW 26, an S5 connection, and the SAE GW 26 may assign to the WCD an IP address for use internally within the core network 10.

In line with the discussion above, once relay-WCD 28 acquires connectivity with donor base station 12 and receives an IP address assignment, the relay-WCD 28 may then provide that IP address to its relay base station 32, so that the relay base station 32 can use that IP address as its own address for communicating with other entities in the core network 10. The relay WCD 28 and relay base station 32 may each be programmed with processor logic to facilitate this. Once the relay base station 32 thus has an IP address on the core network, communications that the relay base station 32 has in the core network 10 will pass via a tunnel through (i) the relay-WCD 28, (ii) the radio link between the relay-WCD 28 and the donor base station 12, and (iii) the SAE GW 26.

When the relay base station 32 thus acquires an IP address in the core network 10, the relay base station 32, like base station 12 on the core network, will form an S1-AP connection with an MME (which could be the same or different than that used by base station 12). To facilitate this, the relay base station 32 may be pre-provisioned with data specifying the IP address of the MME so that the relay base station 32 can engage in signaling with the MME to set up such a connection, via the SAE GW 26. This S1-AP connection with the MME then serves as a signaling channel between the relay base station 32 and the MME.

Further, when a WCD 38 initiates attachment with relay base station 32, relay base station 32 may then signal to the MME to trigger establishment for the WCD 38 of an S1-MME connection between the relay base station 32 and the selected MME, an S1-UE connection between the relay base station 32 and the SGW 18, and an S5 connection between the SGW 18 and the PGW 20, with PGW 20 assigning to WCD 38 an IP address for use on external packet-switched network 22, again with all of these connections possibly passing via the SAE GW.

In accordance with LTE, the air interface on which a base station provides service on a given carrier is divided over time into a continuum of TTIs. In particular, the air interface is divided into a continuum of 10 millisecond frames, and each frame is divided into ten 1-millisecond subframes each defining a respective TTI. On an FDD carrier, all TTIs per frame are used for both downlink and uplink communication. Whereas, on a TDD carrier, some TTIs per frame are used for uplink communication and other TTIs per frame are used for downlink communication.

Further, in each of these TTIs, the air interface defines certain channels for carrying various types of communications between the base station and served WCDs. For example, each downlink subframe defines control channels (e.g., a physical downlink control channel (PDCCH)) for carrying control signaling from the base station to served WCDs, and a shared channel (physical downlink shared channel (PDSCH)) for carrying scheduled communications from the base station to served WCDs. And each uplink subframe defines an uplink control channel (physical uplink control channel (PUCCH)) and an uplink shared channel (physical uplink shared channel (PUSCH)) for carrying scheduled communications from served WCDs to the base station.

The downlink and uplink shared channels are then each divided respectively into a plurality of physical resource blocks (PRBs) (each spanning particular subcarriers and a particular range of time), which the base station schedules for use to carry communications as necessary.

For example, when the base station has data to transmit to a served WCD, the base station selects one or more downlink PRBs in a TTI to carry the data to the WCD, and the base station (i) transmits on the PDCCH of the TTI a downlink control information (DCI) message to the WCD, specifying the assigned PRB(s) and an applicable data modulation scheme to be used for the transmission, and (ii) transmits the data in the assigned PRB(s) of the TTI. The WCD thus receives the DCI message in that TTI, determines the PRB(s) of that carry data to the WCD, and reads the data from the determined PRB(s).

And when a WCD has data to transmit to the base station, the WCD transmits to the base station a scheduling request, and the base station then likewise schedules transmission of the data to occur in a particular uplink TTI. In particular, the base station selects one or more uplink PRBs in an upcoming TTI to carry the data from the WCD, and the base station transmits a DCI message to the WCD in an earlier TTI (such as 4 milliseconds before the scheduled TTI), specifying the assigned PRB(s) in the upcoming TTI and specifying an applicable data modulation scheme to be used for the transmission. The WCD thus receives the DCI message and, in the designated TTI, transmits the data to the base station on the assigned PRB(s).

For both downlink and uplink communication, the receiving end (the WCD or the base station) may evaluate the received data transmission to determine whether the data arrived successfully (e.g., whether the receiving end was able to successfully decode the transmission) and, if not, may request re-transmission. For instance, the receiving end may compute a cyclic redundancy check (CRC) value based on the received data and compare the CRC value with one provided in the transmission. If the receiving end thereby determines that the data arrived successfully, the receiving end may then transmit a positive acknowledgement (ACK) to the transmitting end, and the transmitting end may proceed to engage in a next data transmission. Whereas, if the receiving end determines that that the data did not arrive successfully, then the receiving end may transmit a negative acknowledgement (NACK) to the transmitting end, and the transmitting end may then engage in a re-transmission of the data to the receiving end after a defined delay period, such as four or eight TTIs later.

As noted above, such a re-transmission could be identical to the preceding transmission or could be a variation, possibly a portion of the data along with some forward-error-correction coding, to help the receiving end uncover the intended data. Further, this re-transmission process could be repeated several times for a given instance of data, until the receiving end successfully receives the data.

As further noted above, TTI bundling can help to expedite air interface transmission between a base station and a served WCD, by having the transmitting end automatically retransmit the data a number of times without waiting for a re-transmission request and other delay period before each re-transmission. With TTI bundling, as noted above, the transmitting end (e.g., base station or WCD) automatically engages in multiple repeat transmissions of the data over the course of multiple TTIs, again with each re-transmission being identical or a variation and possibly carrying correction coding to help uncover the intended data. TTI bundling helps to achieve successful receipt of data in the same way that multiple requested re-transmissions do, but TTI bundling advantageously does so without the added delay of requesting re-transmission between each repeat transmission.

A base station may invoke TTI bundling for a given communication (or generally for a WCD) by providing the WCD with a TTI-bundling instruction and by engaging in communication accordingly.

To invoke downlink TTI bundling, for instance, the base station may transmit to the WCD a DCI that assigns particular PRBs that will be used to carry data in each of a series of N downlink TTIs, implicitly or also expressly specifying that TTI bundling will be used, and the base station may engage in transmission of the data repeatedly, once in each TTI of the series. The WCD may thus receive the multiple transmissions of the data, which may increase the likelihood of the WCD successfully receiving the data, without having requested re-transmission between each repeat transmission.

Likewise, to provide uplink TTI bundling, the base station may transmit to the WCD a DCI that assigns particular uplink PRBs that will be used to carry data in each of a series of N uplink TTIs, again implicitly or also expressly specifying that TTI bundling will be used, and the WCD may engage in transmission of the data repeatedly, once in each TTI of the series. The base station may thus receive the multiple transmissions of the data, which may increase the likelihood of the base station successfully receiving the data, without having requested re-transmission between each repeat transmission.

TTI bundling may define a "TTI bundling factor" or repetition factor, indicating how many transmissions will be made in each instance (e.g., the initial transmission plus the automatic re-transmissions). For instance, a TTI bundling factor of three could mean that each transmission will occur three times (once initially, followed by two automatic retransmissions). Whereas a TTI bundling factor of four could mean that each transmission will occur four times (once initially, followed by three automatic retransmissions).

Note that in a variation of TTI bundling, known as hybrid automatic repeat request (HARD) bundling, the transmitting end may automatically engage in multiple transmissions of different data (rather than the same data, possibly with variations and error correction coding), and the receiving end may then transmit a single ACK or NACK cooperatively for the multiple transmissions. For instance, if the transmitting end has a series of data to transmit to the receiving end, the base station could schedule transmission to occur in each of a series of TTIs, and the transmitting end could send some of the data respectively in each of TTI of the series. For each such transmission, the receiving end may then determine whether it successfully received the data. And upon completion of the sequence of transmissions, (i) if the receiving end received all of the transmissions successfully, it may then send an ACK to the transmitting end, but (ii) if the receiving end did not successfully receive any of the transmissions, it may then send a NACK to the transmitting end.

A base station could invoke TTI bundling for various reasons. For example, if a base station determines that a served WCD is in poor coverage of the base station and thus that retransmissions are likely, the base station could invoke TTI bundling to provide for such retransmissions. As another example, if the base station determines that control channel space on its air interface (uplink or downlink) is threshold highly loaded, the base station could invoke TTI bundling in the other direction (downlink or uplink) so as to help reduce the extent of acknowledgment signaling sent in the loaded control channel space. Other factors may be possible as well.

Per the present disclosure, as noted above, a base station will determine that a served WCD is a relay-WCD rather than an end-user WCD and, based at least on that determination, along with possible consideration of one or more other factors, will invoke TTI bundling of its air interface communications with the WCD. By invoking TTI bundling of air interface communications with a relay-WCD, the base station may help to expedite communication between the base station and the relay-WCD and thus to expedite communication between the base station and a relay base station for which the relay-WCD provides wireless backhaul connectivity. Thus, the TTI bundling may help to reduce overall delay of communications to and/or from the relay base station.

Figure 2:
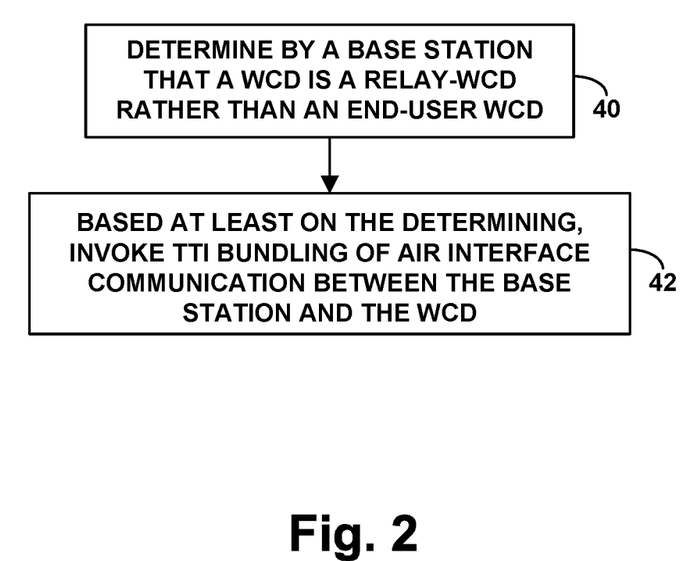
FIG. 2 is a flow chart depicting example operations in accordance with the disclosure.

FIG. 2 is a flow chart depicting features of this method in an example implementation, to help manage air interface communication between a base station and a WCD served by the base station. As shown in FIG. 2, at block 40, the method involves the base station determining that the WCD is a relay-WCD (e.g., WCD 28), rather than an end-user WCD (e.g., WCD 30). And at block 42, the method involves, based at least on the determining that the WCD is a relay-WCD, the base station invoking TTI bundling of air interface communication between the base station and the WCD.

In this method, the base station could determine that the WCD is a relay-WCD by considering information such as that described above (e.g., determining from attach signaling or a profile record that a PLMN identifier or other identifier of the WCD is one that corresponds with the WCD being a relay-WCD or otherwise that the WCD is a relay-WCD) or by being informed by another entity (e.g., an MME) that the WCD is a relay-WCD. Further, the act of determining that the WCD is a relay-WCD could involve determining that the WCD provides wireless backhaul connectivity for a relay base station, in which case the invoking of TTI bundling of air interface communication between the base station and the WCD could be based on the determining that the WCD provides wireless backhaul connectivity for a relay base station.

As discussed above, the base station could be configured to schedule air interface communication between the base station and the WCD with scheduling being done on a per TTI basis. And the act of invoking TTI bundling could involve the base station causing an instance of air interface communication to be automatically repeated over multiple TTIs without a re-transmission request (e.g., including a TTI-bundling instruction in a scheduling directive such as a DCI that the base station sends to the WCD). As noted above, each such re-transmission could be identical to the preceding transmission or could be a variation, possibly including some error correction coding. Further, in an alternative implementation, the TTI bundling could instead be HARQ bundling.

Figure 3:
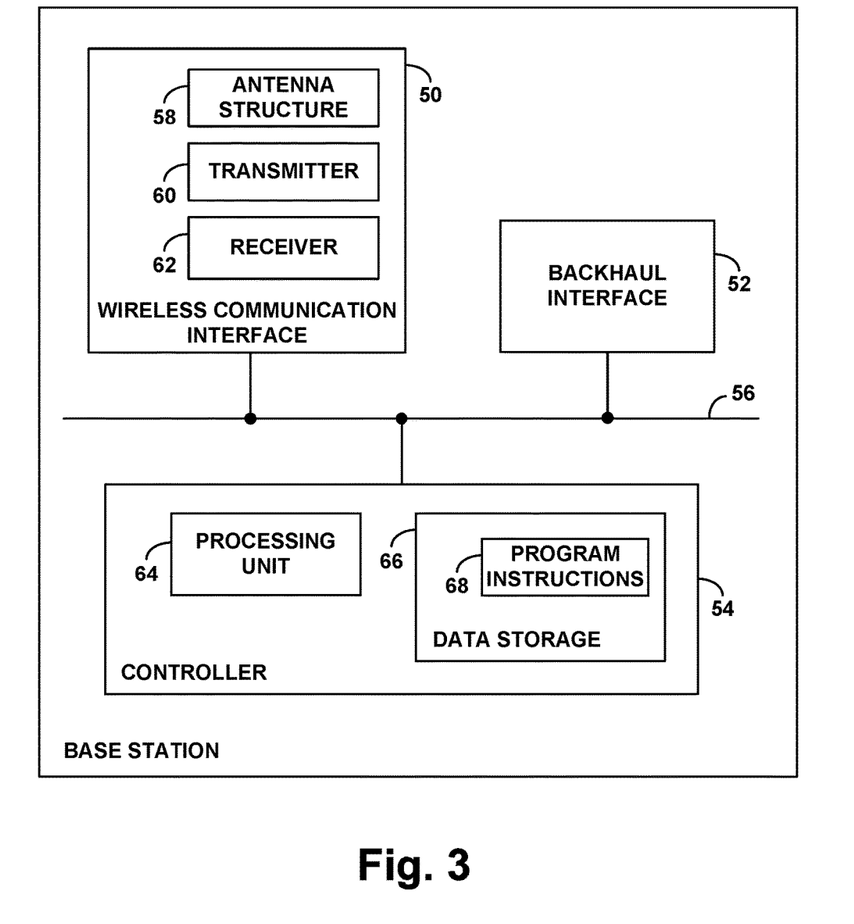
FIG. 3 is a simplified block diagram of an example base station operable in accordance with the disclosure.

FIG. 3 is next a block diagram of an example base station operable to carry out features such as those discussed above. As shown in FIG. 3, the example base station includes a wireless communication interface 50, a backhaul interface 52, and a controller 54. These components are shown communicatively linked together by a system bus or other communication link 56, but it will be understood that the components could alternatively be integrated together or distributed in various ways. For instance, aspects of the controller could be provided in a chipset that implements functions of the wireless communication interface 50. Other examples are possible as well.

As shown, wireless communication interface 50 could include an antenna structure 58, a transmitter 60, and a receiver 62, cooperatively facilitating air interface communication with one or more served WCDs. As such, transmitter 60 could be configured to transmit downlink air interface communication in a plurality of downlink channels (such as those noted above for instance), and receiver 62 could be configured to receive uplink air interface communication in a plurality of uplink channels (such as those noted above as well).

Backhaul interface 52 could then include a wired or wireless network interface, such as an Ethernet interface, through which the base station could communicate with other entities of a core network. And as shown, controller 54 could include a processing unit (one or more processors) 64, non-transitory data storage 66, and program instructions 68 stored in the non-transitory data storage and executable by the processing unit to carry out various operations described herein. As such, the controller could be configured to (i) determine whether a WCD served by the base station is a relay-WCD or rather an end-user WCD and, (ii) based on the determination being that the WCD is a relay-WCD, invoke TTI bundling of air interface communication between the base station and the WCD, for uplink communication and/or downlink communication.

As discussed above, the downlink channels on the air interface could include a downlink shared channel and a downlink control channel, and the uplink channels could include an uplink shared channel. In that case, the base station could transmit the scheduling directive on the downlink control channel, and the TTI bundling could be of communication on the uplink shared channel and/or of communication on the downlink shared channel.

The presently disclosed method could thus be implemented in an arrangement such as that shown in FIG. 1, including a first base station (e.g., base station 12) and a relay (e.g., relay 34) that includes a relay-WCD (e.g., relay-WCD 28) and a second base station (e.g., relay base station 32), where the first base station is configured to serve the relay-WCD over a first air interface, and where the second base station is configured to serve WCDs over a second air interface. In such an arrangement, the first base station could thus be configured to (i) determine that the relay-WCD is a relay-WCD rather than an end-user WCD and (ii) based on the determining, invoke TTI bundling of communications between the first base station and the relay-WCD over the first air interface.

Figure 4:
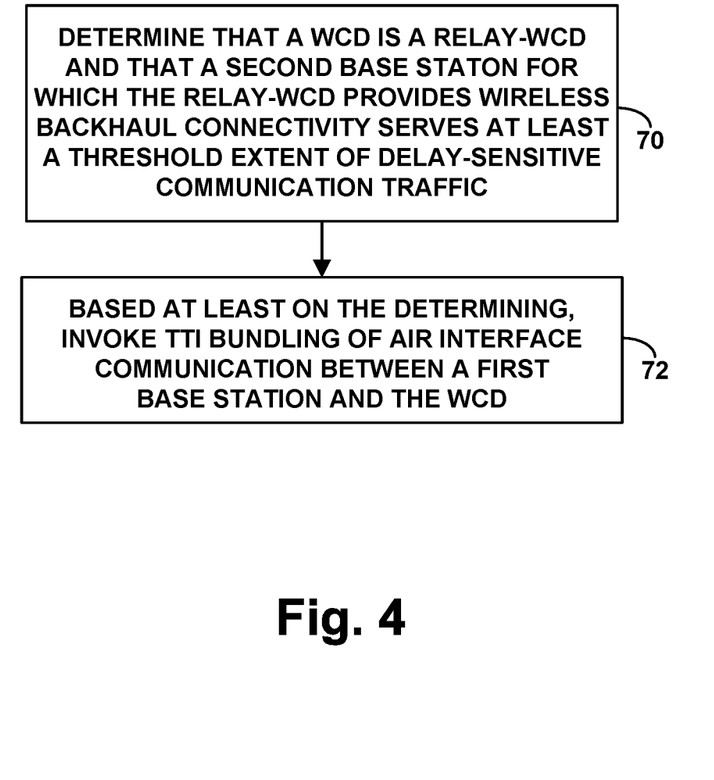
FIG. 4 is another flow chart depicting example operations in accordance with the disclosure.

As further noted above, invocation of TTI bundling for air interface communication between a base station and a relay-WCD could further be based on a determination that the relay-WCD facilitates at least a threshold extent of delay-sensitive communication traffic, and specifically that a relay base station for which the relay-WCD provides wireless backhaul connectivity serves at least a threshold extent of delay-sensitive communication traffic. FIG. 4 is a flow chart depicting features of this method in an example implementation, to help manage air interface communication between a first base station and a WCD served by the first base station.

As shown in FIG. 4, at block 70, the method involves determining that the WCD is a relay-WCD and that a second base station (e.g., relay base station) for which the relay-WCD provides wireless backhaul connectivity serves at least a threshold extent of delay-sensitive communication traffic. And at block 72, the method involves, based at least on the determining, invoking by the first base station transmission TTI bundling of air interface communication between the first base station and the WCD.

In this method, the act of determining that the second base station serves at least a threshold extent of delay-sensitive communication traffic could involve (i) determining an extent of delay-sensitive communication traffic served by the second base station and (ii) determining that the determined extent is at least the threshold extent. Further, either or both of these determinations could be carried out by the second base station, by a core network entity such as an SAE GW, and/or by one or more other entities.

By way of example, in a representative LTE system or the like, when a WCD is engaged in a VoIP call or other such delay-sensitive communication, IP packets flowing to and from the WCD could flow over a bearer having an associated quality of service class indicator (QCI) and/or would be marked with a header value (e.g., differential services point code (DSCP) value) indicating the QCI or otherwise indicating the type of bearer communication, and thus perhaps indicating whether the bearer communication is a type deemed to be delay-sensitive. The second base station or an SAE GW through which such packet data flows may thus determine an extent of delay-sensitive communication being served by the second base station, by monitoring an extent to which packets carry data deemed to be delay-sensitive, and/or based on how many bearers for carrying such delay-sensitive traffic the second base station is currently serving. The second base station and/or SAE GW could then transmit to the first base station an associated signaling message (e.g., via an X2 interface from the second base station, via the SAE GW, to the first base station, or via an interface from the SAE GW to the first base station), to direct or otherwise cause the first base station to invoke TTI bundling for air interface communication with the relay-WCD that provides the second base station with wireless backhaul connectivity.

Further, when invoking TTI bundling, the first base station could apply a TTI bundling factor that is selected based at least in part on the determined extent of delay-sensitive communication traffic served by the second base station, such as by a larger TTI bundling factor as the determined extent of delay-sensitive communication traffic is greater. For instance, the second base station or SAE GW could (i) determine the extent of such delay-sensitive traffic and could select a TTI bundling factor based on that determined extent and (ii) signal to the first base station to cause the first base station to apply the selected TTI bundling factor. Alternatively, the second base station and/or SAE GW could notify the first base station what the extent of such delay-sensitive traffic is, and the first base station could select and apply a TTI bundling factor based on that extent.

Exemplary embodiments have been described above. Those skilled in the art will understand, however, that changes and modifications may be made to these embodiments without departing from the true scope and spirit of the invention.

What is claimed is:

1. A method of managing air interface communication between a base station and a wireless client device (WCD) served by the base station, the method comprising:
    determining by the base station that the WCD is a relay-WCD; and
    based at least on the determining, invoking by the base station transmission time interval (TTI) bundling of air interface communication between the base station and the WCD.

2. The method of claim 1, wherein determining by the base station that the WCD is a relay-WCD comprises determining by the base station that the WCD provides wireless backhaul connectivity for a relay base station, wherein the invoking TTI bundling of air interface communication between the base station and the WCD is based on the determining that the WCD provides wireless backhaul connectivity for a relay base station.

3. The method of claim 1, wherein the WCD operates under a public land mobile network (PLMN) identifier that indicates the WCD is a relay-WCD, and wherein determining by the base station that the WCD is a relay-WCD comprises determining by the base station that the WCD operates under the PLMN identifier.

4. The method of claim 1, wherein a profile record for the WCD indicates that the WCD is a relay-WCD, and wherein determining by the base station that the WCD is a relay-WCD is based on reference to the profile record.

5. The method of claim 1, wherein determining that the WCD is a relay-WCD comprises determining that the WCD is a relay-WCD rather than an end-user WCD.

6. The method of claim 1, wherein the base station schedules air interface communication between the base station and the WCD, wherein the scheduling is on a per TTI basis, and wherein the base station invoking of TTI bundling comprises the base station causing an instance of air interface communication to be automatically repeated over multiple TTIs without a re-transmission request.

7. The method of claim 6, wherein the base station causing the instance of air interface communication to be automatically repeated over multiple TTIs without a re-transmission request comprises the base station including a TTI-bundling instruction in a scheduling directive that the base station sends to the WCD.

8. A base station comprising:
a transmitter for transmitting downlink air interface communications in a plurality of downlink channels;
a receiver for receiving uplink air interface communications in a plurality of uplink channels; and
a controller, wherein the controller is configured to (i) determine whether a wireless client device (WCD) served by the base station is a relay-WCD or rather an end-user WCD and, (ii) based on the determination being that the WCD is a relay-WCD, invoke transmission time interval (TTI) bundling of air interface communication between the base station and the WCD.

9. The base station of claim 8, wherein the TTI bundling is of at least the uplink air interface communications.

10. The base station of claim 9, wherein the TTI bundling is also of the downlink air interface communications.

11. The base station of claim 8, wherein determining whether the WCD is a relay-WCD comprises determining whether the WCD provides wireless backhaul connectivity for a relay base station, wherein the invoking TTI bundling of air interface communication between the base station and the WCD is based on the determining that the WCD provides wireless backhaul connectivity for a relay base station.

12. The base station of claim 8, wherein the WCD operates under a public land mobile network (PLMN) identifier that indicates the WCD is a relay-WCD, and wherein determining that the WCD is a relay-WCD comprises determining by the base station that the WCD operates under the PLMN identifier.

13. The base station of claim 8, wherein a profile record for the WCD indicates that the WCD is a relay-WCD, and wherein determining that the WCD is a relay-WCD is based on reference to the profile record.

14. The base station of claim 8, wherein the base station schedules air interface communication between the base station and the WCD, wherein the scheduling is on a per TTI basis, and wherein invoking TTI bundling comprises causing an instance of air interface communication to be automatically repeated over multiple TTIs without a re-transmission request.

15. The base station of claim 14, wherein causing the instance of air interface communication to be automatically repeated over multiple TTIs without a re-transmission request comprises including a TTI-bundling instruction in a scheduling directive that the base station sends to the WCD.

16. The base station of claim 15,
wherein the plurality of downlink channels includes a downlink shared channel and a downlink control channel, and the plurality of uplink channels includes an uplink shared channel,
wherein the base station transmits the scheduling directive on the downlink control channel, and
wherein the TTI bundling is of communication on at least one of the uplink shared channel or the downlink shared channel.

17. A wireless communication system comprising:
a first base station configured to serve wireless client devices (WCDs) over a first air interface; and
a relay including a relay-WCD and a second base station, wherein the first base station is configured to serve the relay-WCD over the first air interface, and wherein the second base station is configured to serve WCDs over a second air interface,
wherein the first base station is further configured to (i) determine that the relay-WCD is a relay-WCD rather than an end-user WCD and (ii) based on the determining, invoke transmission time interval (TTI) bundling of communications between the first base station and the relay-WCD over the first air interface.

18. The wireless communication system of claim 17, wherein determining whether the relay-WCD is a relay-WCD comprises determining whether the relay-WCD provides wireless relay backhaul connectivity, wherein the invoking TTI bundling of air interface communication between the first base station and the relay-WCD is based on the determining that the relay-WCD provides wireless relay backhaul connectivity.

19. The wireless communication system of claim 17, wherein the relay-WCD operates under a public land mobile network (PLMN) identifier that indicates the relay-WCD is a relay-WCD rather than an end-user WCD, and wherein determining that the relay-WCD is a relay-WCD rather than an end-user WCD comprises determining that the relay-WCD operates under the PLMN identifier.

20. The wireless communication system of claim 17, wherein the first base station is further configured to receive a signal indicative of the second base station serving at least a threshold extent of delay-sensitive traffic, and wherein the invoking of TTI bundling is based at least in part on both (i) the determining that the relay-WCD is a relay-WCD and (ii) receiving the signal indicative of the second base station serving at least the threshold extent of delay-sensitive traffic.

21. The wireless communication system of claim 17,
wherein the first base station is configured to schedule air interface communication between the first base station and the relay-WCD, wherein the scheduling is on a per TTI basis, and wherein invoking TTI bundling comprises causing air interface communication to be automatically repeated over multiple TTIs without a request for re-transmission request between each repetition, and
wherein causing air interface communication to be automatically repeated over multiple TTIs without a request for re-transmission between each repetition comprises including a TTI-bundling instruction in a scheduling directive that the base station sends to the relay-WCD.

22. A method of managing air interface communication between a first base station and a wireless client device (WCD) served by the first base station, the method comprising:
determining that the WCD is a relay-WCD and that a second base station for which the relay-WCD provides wireless backhaul connectivity serves at least a threshold extent of delay-sensitive communication traffic;

based at least on the determining, invoking by the first base station transmission time interval (TTI) bundling of air interface communication between the first base station and the WCD.

23. The method of claim 22, wherein determining that the second base station serves at least a threshold extent of delay-sensitive communication traffic comprises (i) determining an extent of delay-sensitive communication traffic served by the second base station and (ii) determining that the determined extent is at least the threshold extent.

24. The method of claim 23, further comprising the first base station applying a TTI bundling factor selected based at least in part on the determined extent of delay-sensitive communication traffic.

25. The method of claim 22, wherein delay-sensitive communication traffic comprises voice over Internet Protocol (VoIP) communication traffic.

26. The method of claim 22, wherein determining that the second base station serves at least the threshold extent of delay-sensitive communication traffic is done at least in part by the second base station.

27. The method of claim 22, wherein determining that the second base station serves at least the threshold extent of delay-sensitive communication traffic is done at least in part by a core network gateway system through which the delay-sensitive communication traffic passes.

* * * * *